(No Model.)
T. W. MORAN.
DOUBLE COUPLING FOR PIPES.
No. 441,108. Patented Nov. 18, 1890.
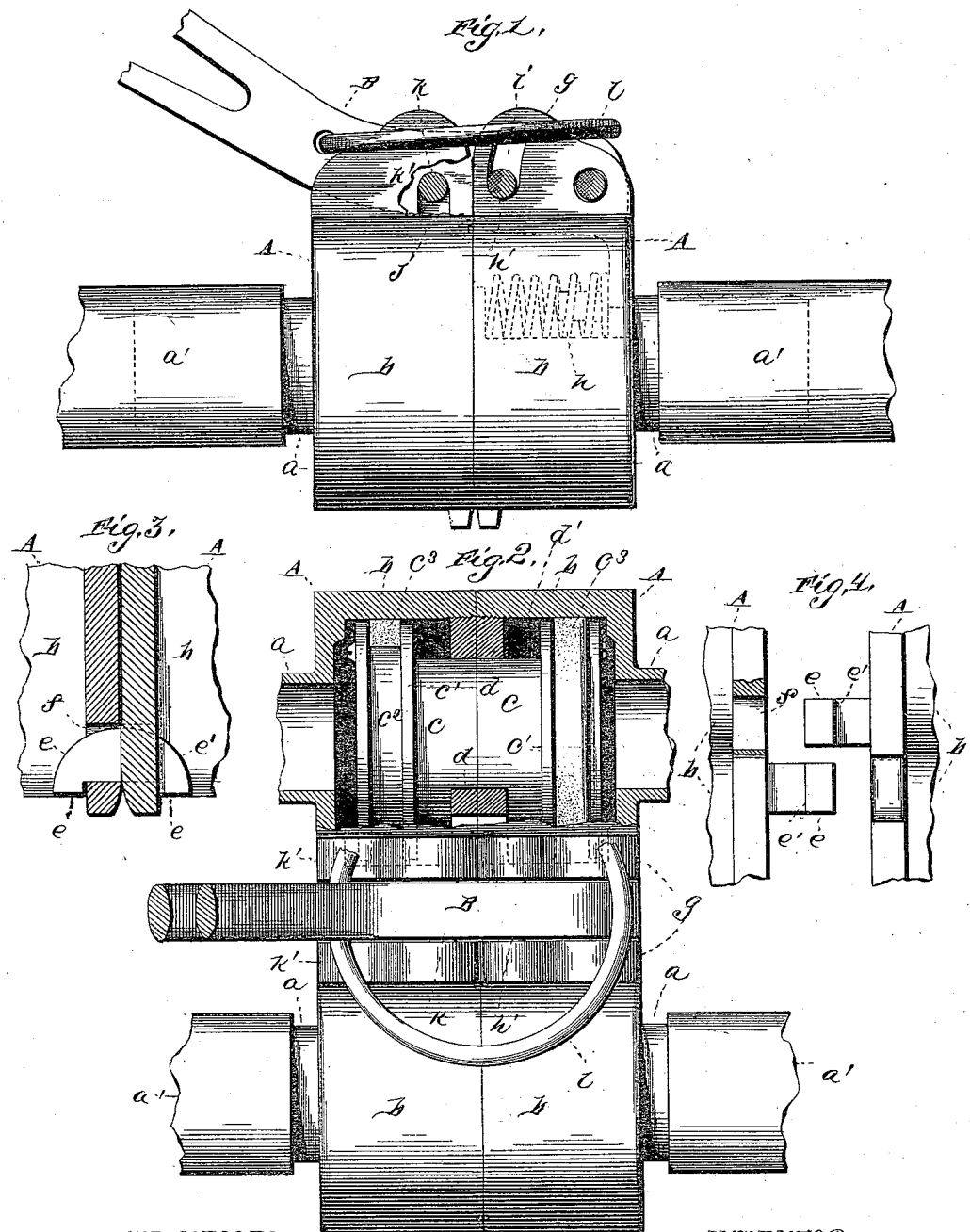
WITNESSES
INVENTOR
Thomas W. Moran,
by E. W. Anderson
his Attorney

United States Patent Office.

THOMAS WILLIAM MORAN, OF LOUISVILLE, KENTUCKY, ASSIGNOR TO THE MORAN FLEXIBLE STEAM JOINT COMPANY, OF SAME PLACE.

DOUBLE COUPLING FOR PIPES.

SPECIFICATION forming part of Letters Patent No. 441,108, dated November 18, 1890.

Application filed May 5, 1890. Serial No. 350,656. (No model.)

*To all whom it may concern:*

Be it known that I, THOMAS WILLIAM MORAN, a citizen of the United States, and a resident of Louisville, in the county of Jefferson and State of Kentucky, have invented certain new and useful Improvements in Double Couplings for Pipes; and I do declare the following to be a full, clear, and exact description of the invention, such as will enable others skilled in the art to which it appertains to make and use the same, reference being had to the accompanying drawings, and to letters of reference marked thereon, which form a part of this specification.

Figure 1 is a side elevation of my improved pipe-coupling, portions of the connecting pipes or hose being broken away. Fig. 2 is a partly sectional and a partly plan view of the same. Fig. 3 is a detailed sectional view taken intermediately of the cylindric chambers; and Fig. 4 is an inverted detailed view showing more especially the catches or studs between the cylindric chambers, parts also being broken away and in section.

This invention relates to certain improvements in hose or pipe couplings, and is especially designed for steam or atmospheric-air brakes on cars; and it consists in the novel construction and combination of parts, as will appear from the following description and accompanying drawings.

In the drawings, A A refer to the two sections of the coupling, each of which has two nozzles $a\ a$ for the connection thereto of the hose or pipe $a'\ a'$, suitably held thereon. Each coupling-section has also two cylindric chambers $b'\ b'$ of greater diameter than their nozzles, and within these chambers are inserted or telescoped the hollow pistons or tubes $c\ c$, of corresponding diameters in their bores with said nozzles. The inner ends of the pistons or tubes $c\ c$ are provided with annular or circular flanges $c'\ c'$, which fit the chambers $b$, and are provided with peripheral grooves $c^2$, containing packing $c^3$ to pack the pistons steam or air tight.

$d\ d$ are rings, which have screw-threaded connection with the inner walls or surfaces of the chambers $b$ and closely fit the tubes or pistons $c\ c$. These rings fit flush with the faces of the coupling-sections, but stand considerably away from the bottoms or inner ends of the chambers $b$, thereby providing annular spaces $d'\ d'$ to permit of the sliding movement of the flange $c'\ c'$ of the tubes or pistons $c$, which is effected by the impact of steam or air pressure upon said flanges, in order to effect engagement between the tubes or pistons of opposite coupling-sections. Thus the steam or air pressure passed through the hose or pipe to apply the brakes or for other purposes is utilized by its action upon the sliding tubes or pistons $c\ c$, as just described, to effect a perfect air or steam tight joint between the meeting or facing ends of said tubes.

Each coupling-section is provided upon its face at one side, between the chambers $b\ b'$, with a beveled catch or stud $e$, having an offset portion $e'$, and with an aperture $f$ alongside of said catch or stud, the catch-stud and aperture upon one coupling-section being adapted to engage and interlock with those of the other coupling-section, thus hinging or holding said coupling-sections together at one side.

B is a lever or latch having one end pivoted between lugs or ears $g$, cast upon opposite coupling-sections A and yieldingly held in position by the action of a spring $h$, seated in between said coupling-sections and pressing upon the end of the lever. This lever has also near its pivoted point a cross-pin $h'$, which engages slots $i\ i$ in the ears or lugs $g$, which limit the inward or engaging movement of said lever to prevent too great compression of the spring $h$ by the lever. The lever B has also a notch $j$ to engage a cross-pin $k$, held in and between two lugs $k'$, cast upon the opposite coupling-sections, thus effecting a complete connection between the coupling-sections.

A ring or link $l$, held in the lever B, may have attached to it a chain or line (not shown) reaching and connecting to the car for convenience in operating said lever for separating or uncoupling the coupling-sections; also, in case of the accidental uncoupling of the cars.

This arrangement of the lever or latch with its limiting-pin and slot and ring may be duplicated for the other coupling-section, this being preferably done by reducing the thickness of each latch and accordingly adjusting the size of the other adjunctive parts thereof.

This invention, it will be observed, forms a double coupling connecting two series of pipe or hose sections between cars or elsewhere for the purpose of carrying a volume of steam or air pressure in different directions at the same time through one and the same coupling.

It will be understood that I make no claim in this application to the subject-matter claimed in my application, Serial No. 341,525, filed February 24, 1890—viz., the coupling-joint consisting of the tubular coupling-sections having each a diametrically-enlarged annular chamber and the cylindric hollow piston-form joint-pieces, each having at its inner end an enlarged superficial area partly inclosed by said annular chamber and partly in the plane of the contracted portion of the chambers or bores of said coupling-sections, said joint-pieces being suitably packed and the coupling-sections being connected together.

Having described this invention, what I claim, and desire to secure by Letters Patent, is—

The hose or pipe coupling combining the duplicate pairs of coupling or cylinder sections, the lever or latch having one end pivoted between lugs or ears of opposite sections, and provided near its pivotal point with a cross-pin engaging slots in said lugs and with a notch in its under side engaging a cross-pin held in and between opposite lugs of additional opposite sections, and the spring holding the latch or lever yieldingly in position, substantially as and for the purpose set forth.

In testimony whereof I affix my signature in presence of two witnesses.

THOS. WILLIAM MORAN.

Witnesses:
FRED HOEFER,
R. D. LEEFTER.